United States Patent Office 2,967,845
Patented Jan. 10, 1961

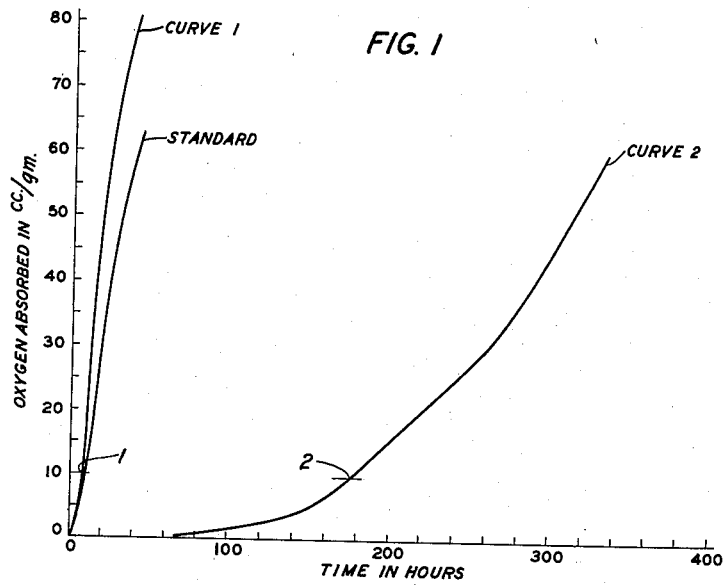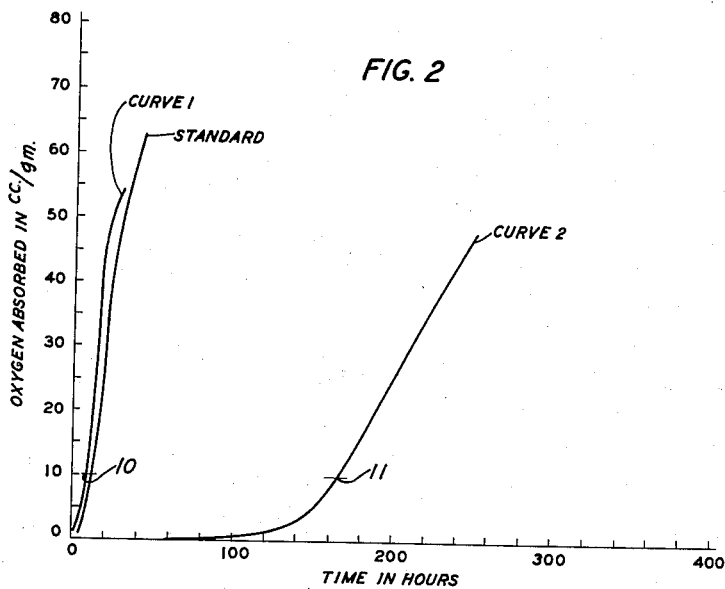

2,967,845

ALPHA OLEFIN HYDROCARBONS STABILIZED WITH CARBON BLACK AND A CARBOCYCLIC THIOETHER

Walter L. Hawkins, Montclair, Vincent L. Lanza, Summit, and Field H. Winslow, Springdale, N.J., assignors to Bell Telephone Laboratories, Incorporated, New York, N.Y., a corporation of New York Filed Nov. 29, 1956, Ser. No. 625,067

11 Claims. (Cl. 260—41)

This invention relates to the stabilization of polymeric materials against oxidation by the inclusion therein of small amounts of retarders and to highly stabilized products so produced. This invention is primarily directed to such processes and products in which protection against oxidation taking place under the influence of ultraviolet radiation is imparted to the polymeric material by the additional inclusion therein of finely dispersed particles of carbon.

The oxidative mechanism against which protection is afforded in accordance with this invention takes place only in essentially saturated hydrocarbon polymeric materials containing tertiary hydrogen atoms and this invention is therefore restricted to compositions containing such polymeric materials. Polymers containing tertiary hydrogen atoms are of two types; those containing random numbers and spacing of tertiary hydrogen atoms such as polyethylene and those containing ordered hydrogen atoms such as polypropylene. This invention is concerned with either category of polymers containing tertiary hydrogen atoms and also with copolymers and mixtures both of which contain at least one such polymer. Examples of polymers included in this invention in addition to those named are polymers of butene-1, 3-methyl butene-1, 4-methyl pentene-1, 4,4-dimethyl pentene-1, dodecene-1, and 3-methyl pentene-1.

Some of the polymers under consideration may have as few tertiary hydrogen atoms as one for every hundred carbon atoms while others such as polypropylene may have as many as one tertiary hydrogen atom for every two carbon atoms. Although the most common polymeric materials falling within the class above outlined are the polymerization products of monomers containing four or fewer carbon atoms, polymerized products of higher order monomers may also be stabilized in accordance with this invention providing they contain tertiary hydrogen atoms as may copolymers and mixtures containing such polymers. For a discussion of the oxidative mechanism against which protection is imparted in accordance with this invention, see Modern Plastics, volume 31, pages 121 to 124, September 1953.

Some of the polymeric materials included in the class above set forth have already attained considerable commercial importance; notably, the various types of polyethylene. Some of the other materials in this class have excellent electrical and mechanical properties and will doubtless find widespread use in the near future.

Many of the most important applications of polyethylene such as its use in cable sheathings, depend on its very good mechanical properties such as high tensile strength and abrasion resistance coupled with its repellent properties against water and water vapor. Other uses take advantage of its high dielectric strength in applications such as primary insulation of wire conductors.

Unfortunately, however, polymeric materials such as polyethylene and the others listed are subject to deterioration from sunlight and heat both of which induce oxidation of the long chain polymeric structure and thereby impair tensile strength, low temperature brittleness and dielectric properties. Oxidative deterioration in the absence of ultraviolet rays is here referred to as "thermal oxidation" and as the term implies, the effect is substantially accelerated by an increase in temperature.

It was discovered some time ago by workers in the field that effects due to ultraviolet absorption could be effectively avoided by the incorporation into the polymer of small amounts of finely dispersed particles of carbon black. Effective light shielding from ultraviolet emission is afforded by the incorporation into the polymer of from about .05 percent to about 5 percent by weight, and usually about 3 percent, of carbon black particles of the order of somewhat less than 1000 angstroms in size. Many types of carbon black are commercially available for this purpose and their use is widespread. Any such materials are effective in combination with the retarders of this invention in producing a stabilized polymeric product.

The deleterious degradative effect of thermal oxidation on polymers such as polyethylene and polypropylene have also received considerable attention by researchers in the field. Effective "antioxidants" developed for this purpose are generally secondary amines of aromatic compounds which may, in addition to the amino grouping, contain, as an additional ring substituent, a branched or normal aliphatic radical generally containing three or more carbon atoms. As is well known, a general requirement of such antioxidants is that they contain an antioxidant group attached to an aromatic ring, the compound having such a structure that its resulting radical is stabilized by resonance energy. Much consideration has been given such antioxidants in the texts, see, for example, G. W. Wheland's "Advanced Organic Chemistry," 2nd edition, chapters 9 and 10.

However, even though it has been known for some time that ultraviolet degradation may be effectively prevented by the use of a dispersion of carbon black particles, and even though thermal oxidative degradation may be avoided by the use of any of several antioxidants commercially available for this purpose, a further difficulty has been encountered in attempts to prepare polymeric compositions which are at the same time stabilized against both influences. In view of the knowledge that certain carbon blacks when incorporated into essentially saturated hydrocarbon polymers have a mild antioxidant effect in addition to shielding the substance against ultraviolet radiation, it was expected that the incorporation of known antioxidants into polymeric materials containing such carbon blacks would result in increased stability against thermal oxidation. It was discovered, however, that, not only is the effect of the presence of such antioxidants and carbon black in the polymer not additive, but that the effectiveness of the antioxidant in the presence of carbon black is reduced several fold, and in many instances is rendered completely ineffectual in that such a product has no more resistance against thermal oxidative degradation than does a sample containing no thermal antioxidant whatever.

In accordance with the disclosure herein, we have discovered a class of materials which, when combined with carbon black in polymeric material such as polyethylene, results in a stabilized product which compares favorably with polymeric materials in which have been incorporated the most effective commercially available antioxidants and which contain no carbon black. These materials which are for the most part completely ineffectual in the absence the carbon black appear to owe their effectiveness to a different mechanism than that of the commercially available anti-oxidants.

The retarder materials of this invention are all thioethers containing two aromatic nuclei at least one of which is joined to the sulfur atom through a methylene group. These materials may be symmetrical in which event they contain two aryl methylene radicals joined by a sulfur atom such, for example, as dibenzyl sulfide or they may be asymmetrical containing one aryl methylene group and one aryl group joined by a sulfur such as benzyl phenyl sulfide. Additionally, these retarder materials may contain any number of hydrocarbon ring substituents providing, however, that the total number of carbon atoms in a moiety, that is either part of the molecule bonded to a sulfur atom, does not exceed 30.

Examples of retarders within the scope of this invention are:

o-Methylphenyl benzyl sulfide
m-Methylphenyl benzyl sulfide
p-Methylphenyl benzyl sulfide
o-Ethylphenyl benzyl sulfide
m-Ethylphenyl benzyl sulfide
p-Ethylphenyl benzyl sulfide
n-Propylphenyl benzyl sulfide (o, m, p)
Iso-proplyphenyl benzyl sulfide (o, m, p)
n-Butylphenyl benzyl sulfide (o, m, p)
Iso-butylphenyl benzyl sulfide (o, m, p)
Sec-butylphenyl benzyl sulfide (o, m, p)
Tert-butylphenyl benzyl sulfide (o, m, p)
o-Methylbenzyl phenyl sulfide
m-Methylbenzyl phenyl sulfide
p-Methylbenzyl phenyl sulfide
o-Ethylbenzyl phenyl sulfide
m-Ethylbenzyl phenyl sulfide
p-Ethylbenzyl phenyl sulfide
n-Propylbenzyl phenyl sulfide (o, m, p)
Iso-propylbenzyl phenyl sulfide (o, m, p)
n-Butylbenzyl phenyl sulfide (o, m, p)
Iso-butylbenzyl phenyl sulfide (o, m, p)
Sec-butylbenzyl phenyl sulfide (o, m, p)
Tert-butylbenzyl phenyl sulfide (o, m, p)
Methylphenyl methylbenzyl sulfide (all o, m, p isomers)
n-Butylphenyl butylbenzyl sulfide (o, m, p)
Iso-butylphenyl butylbenzyl sulfide (o, m, p)
Sec-butylphenyl butylbenzyl sulfide (o, m, p)
Tert-butylphenyl butylbenzyl sulfide (o, m, p)
Benzyl alpha-naphthyl sulfide
o-Methylbenzyl alpha-naphthyl sulfide
m-Methylbenzyl alpha-nahthyl sulfide
p-Methylbenzyl alpha-naphthyl sulfide
n-Butylbenzyl alpha-naphthyl sulfide (o, m, p)
Iso-butylbenzyl alpha-naphthyl sulfide (o, m, p)
Sec-butylbenzyl alpha-naphthyl sulfide (o, m, p)
Tert-butylbenzyl alpha-naphthyl sulfide (o, m, p)
Benzyl beta-naphthyl sulfide
o-Methylbenzyl beta-naphthyl sulfide
m-Methylbenzyl beta-naphthyl sulfide
p-Methylbenzyl beta-naphthyl sulfide
n-Butylbenzyl beta-naphthyl sulfide (o, m, p)
Iso-butylbenzyl beta-naphthyl sulfide (o, m, p)
Sec-butylbenzyl beta-naphthyl sulfide (o, m, p)
Tert-butylbenzyl beta-naphthyl sulfide (o, m, p)
Phenyl beta-naphthylmethyl sulfide
Phenyl alpha-naphthylmethyl sulfide
Phenyl anthrylmethyl sulfide
Benzyl anthryl sulfide In accordance with our discovery protection is afforded essentially saturated hydrocarbon polymers containing tertiary hydrogen atoms such as polyethylene by the retarder materials of this invention only when the polymeric product also contains dispersed carbon black particles. However, although the basic retarder action herein described is obtained only in the presence of carbon black, additional antioxidant protection may be afforded polyethylene not containing carbon black by the incorporation of additional ring substituents which have recognized antioxidant properties in such polymeric materials. For example, if one or more hydroxyl or secondary amine radicals is added as a ring substituent to either or both moieties of the primary retarder molecule an additional antioxidant action similar to that obtained by use of any of the commercially available antioxidants may be obtained. As is known to those familiar with this field, effective antioxidant action would be additionally dependent upon the presence of a blocking influence furnishing steric hindrance to the compound so formed so as to prevent the antioxidant grouping from being oxidized too rapidly and to assure a reasonable protective life. Whereas, in the instance of a fused aromatic nucleus bonded to the sulfur atom either through a methylene group or directly through a ring carbon, a hydroxyl or secondary amino substituent on one of the fused rings may be adequately hindered by the second ring, in the instance of the hydroxylation of a single ring aromatic nucleus bonded directly to the sulfur as in, for example, o-hydroxy phenyl benzyl sulfide, a second ring substituent such, for example, as a tertiary butyl radical may be added to sterically hinder the molecule in accordance with conventional practice.

The advantages gained by use of the compositions of this invention will be appreciated by reference to the figures of the accompanying drawing on which coordinates of oxygen absorption against time present oxidation data for paired samples of polymer, each pair including one sample containing both a retarder and carbon black and one sample containing only the retarder and also for a control sample of unprotected polymer, wherein:

Fig. 1 contains two such curves for polyethylene samples containing benzyl phenyl sulfide together with a standard curve for unprotected polyethylene; and Fig. 2 contains two such curves for polyethylene samples containing dibenzyl sulfide and a standard curve for the unprotected polymer.

Figs. 1 and 2 are plotted from data representative of that obtained from one type of standard accelerated aging test for polymeric materials. Such test procedures are well known and data taken therefrom is of known significance. To aid in the description of these figures, an outline of the accelerated test procedure used is set forth below:

ACCELERATED TEST PROCEDURE

The saturated hydrocarbon polymer which in all of the tests for which data is reported on the accompanying figure was polyethylene, together with a retarder as reported herein and carbon black where required was prepared by mill massing on a 6-inch by 12-inch two-roll mill having roll speeds of approximately 25 and 35 r.p.m. with the rolls at a temperature of about 120° C. The polyethylene used in these studies was a commercial, high-molecular weight, high-pressure polymer supplied by the Bakelite Company as DYNK. This particular polymeric product finds widespread use in industry in such applications as cable sheathing and primary conductor insulation. Where carbon black was to be included, a master batch of polyethylene and 25 percent by weight of carbon black was first prepared by milling, after which the concentration of carbon black was cut back to about 3 percent by dilution with additional polyethylene. This procedure was followed to insure good dispersion of the carbon black throughout the polymer. In instances where the melting point of the retarder under study was above 255° F., the master batch also contained an amount of such retarder in excess of the amount to be tested. In such instances, the excess of retarder was proportionally equal to the excess of carbon black so that the amounts of both additives could be reduced to the desired levels by the addition of polyethylene. Where the melting point of the retarder was below 255° F., it was added directly in the desired concentration to the diluted mix which already contained the desired amount of carbon black, special care being taken to avoid loss of retarder by evaporation.

Test sheets of the polymeric material containing both the retarder and the carbon black were molded to a thickness of approximately 50 mils, and 14-millimeter diameter disks were cut from these sheets. Four such disks, each in a shallow glass cup, were placed in a Pyrex glass tube attached to a mercury manometer together with about 2 grams of powdered barium oxide or similar absorbent. The reaction vessel, after being successively evacuated and filled with oxygen to assure a complete oxygen environment, was again filled with oxygen and was placed in an air-circulating strip-heater oven maintained at 140° C. and of such design as to assure a variation of no more than 1° C. throughout the entire volume in the oven. The reaction vessel was immediately connected to an oxygen gas burette with a short length of polyvinyl chloride tubing. After reaching temperature equilibrium at the said temperature of about 140° C. which took about 15 minutes, the system was adjusted to zero reading at atmospheric pressure. Readings of oxygen uptake were made as required at atmospheric pressure, one such reading being taken every 4 to 12 hours.

Referring again to Fig. 1, the coordinates are oxygen uptake in cubic centimeters per gram of sample as measured on the mercury-filled manometer on the ordinate and hours of exposure with the sample maintained at 140° C. on the abscissa. Curve 1 is plotted from absorption data taken from a test on a sample of polyethylene containing 0.1 percent by weight of benzyl phenyl sulfide and no dispersed carbon while curve 2 is plotted from data from a test run using a sample of polyethyene containing 0.1 percent of benzyl phenyl sulfide and in addition obtaining 3 percent by weight of carbon black particles. The "standard" curve corresponds to the control sample containing neither retarder nor carbon black. In interpreting curves such as those depicted in Figs. 1 and 2, it is generally assumed that the useful properties of polyethylene and other such polymeric materials are not critically affected until the amount of oxygen absorbed by the polymer is of the order of 0.5 percent by weight which critical limit in terms of the units used in the figures is of the order of 10 cubic centimeters per gram.

Examining curve 1 it is seen that the rate of oxidation is substantially linear starting at the origin and proceeding for a period of about 20 hours which mark the end of that run. At the end of about 7 hours the polyethylene had been oxidized to its critical limit of 10 cubic centimeters uptake of oxygen (point 1). In contrast with curve 1 it is seen that the sample of polyethylene containing carbon black in addition to benzyl phenyl sulfide after 7 hours of exposure has not yet absorbed an amount of oxygen which is detectable on the manometer used in the test. Only after about 175 hours of exposure (point 2) has the oxygen uptake obtained the value of 10 cubic centimeters per gram. Comparison of curves 1 and 2 with the standard indicates that protection was given the polymer only by the retarder plus carbon black (curve 2).

In view of the fact that the very best commercially available antioxidant when incorporated in clear polyethylene results in a protective period by such accelerated test of about this order of magnitude and affords substantially no protection to polyethylene containing carbon black particles, the stabilized period resulting from the use of benzyl phenyl sulfide in polyethylene containing carbon black is favorable.

Fig. 2 on the same coordinates as those of Fig. 1 contains a standard curve for pure polyethylene and two curves denoted curve 1 and curve 2 plotted from test runs of polyethylene samples both containing 0.1 percent of dibenzyl sulfide and the sample of curve 2 containing 3 percent of dispersed carbon black particles in addition. Again a large improvement is seen in the sample containing retarder and carbon black, the clear sample having absorbed 10 cubic centimeters of oxygen after about 5 hours of exposure (point 10) while the sample also containing carbon black has absorbed this limit only after about 164 hours (point 11).

It will be noted that there is a difference in form between curves 2 of Figs. 1 and 2 and that which generally results on plotting data taken from such accelerated tests made on polymeric samples containing common commercial antioxidants. In the usual situation there is a pronounced break in the curve before which oxygen uptake proceeds at a very slow rate and after which oxidation proceeds virtually unhampered so that the latter portion of the curve has a very steep slope. In the two curves for the polymeric samples containing carbon black in addition to the retarder materials herein, although the slope is not constant, the change in slope is considerably less pronounced than that for conventional antioxidants. Since the curves herein are more nearly characteristic of substances protected by that group of antioxidants known as retarders the latter term is used in the description of this invention.

Whereas in the absence of an antioxidant such as the retarders of this invention, oxidation of any part of a polymeric molecule produces a chain reaction with a consequent rapid breakdown of the polymer, the presence of a retarder results in oxidation of the polymer in such manner that an autocatalytic chain reaction is not brought about so that oxidation, although it proceeds, does so at a slower rate thereby resulting in a characteristic curve such as either of those denoted curve 2 of Figs. 1 and 2. Furthermore, the fact that neither curve shows a pronounced change in slope over the period of exposure as do all samples protected by commercially available antioxidants, may indicate some regeneration of the retarder.

A postulated reaction which would explain the above results and which is consistent with known reactions follows:

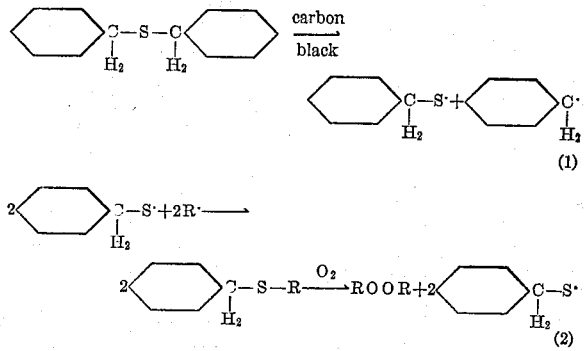

in which R· represents the oxygenated polymeric radical. Although Equation 1 above is specific to dibenzyl sulfide, it is intended as a general explanation of the reaction which occurs in any essentially saturated polymer containing tertiary hydrogen atoms such as polyethylene containing any retarder described herein together with dispersed carbon black particles. In the instance of an asymmetrical retarder in which one aromatic nucleus is attached directly to the sulfur through a carbon, it is expected that the sulfur to methylene carbon bond severs in the presence of carbon black so as to result in an aryl sulfide radical. However, regardless of whether the sulfur to methylene carbon bond or the sulfur to aromatic carbon bond severs, the resultant sulfide radical would be expected to behave in the manner of the benzyl sulfide radical of Equation 2 above. In accordance with this disclosure, the above reaction although specific to otherwise unsubstituted dibenzyl sulfide is intended as a general postulated explanation of the mechanism occurring upon incorporation of any of the retarders of this invention in any essentially saturated hydrocarbon polymer containing tertiary hydrogen atoms together with dispersed carbon particles. In accordance with this disclosure, either or both phenyl radicals may be replaced by any other aromatic ring structure such as naphthyl or anthryl radicals. Also, either or both of the aromatic nuclei of the condensed molecule may contain in addition as ring substituents one or more hydroxyl, secondary amino or other antioxidant group and may contain any number of hydrocarbon ring substituents providing that the total number of carbon atoms in either moiety does not exceed 30.

As Equations 1 and 2 above indicate, breakdown of the retarder in the presence of carbon black particles results in the formation of an aryl sulfide or an aryl methylene sulfide radical which then retards oxidation of the polymeric chain by producing

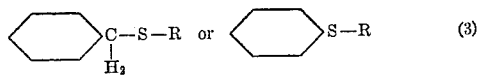 (3)

structure which is in turn oxidized to regenerate the sulfide radical together with the ROOR type of structure. Apparently, this ROOR compound is fairly stable and does not result in the initiation of a chain reaction such as is normally produced in a polymeric material such as polyethylene in the presence of oxygen.

Why the reaction set forth above does not occur in clear polyethylene is not known, although it is postulated that the sulfide radical is produced only under the catalytic influence of carbon black. It should be especially noted that the equations above are offered only as a possible explanation of the observed retarder action, and dependence is in no way had upon this explanation either as a basis for the specification or as substantiation for the claims herein.

Since neither of the specific retarder materials for which curves are presented is readily available from a commercial source, the synthesis used for preparing these materials is set forth below:

*1. Synthesis of benzyl phenyl sulfide*

A 1-liter, 4-necked round bottom flask was equipped with an addition funnel, Hershberg stirrer and a water-cooled condenser. Into the flask was poured a solution of 12 grams (0.52 mol) of sodium metal in 300 millimeters of absolute ethanol. To this was added slowly with stirring at room temperature 57 grams (0.52 mol) of thiophenol. Then 68.8 grams (0.54 mol) of benzyl chloride was added dropwise over a period of about one hour. After the addition had been completed the mixture was refluxed for two hours. The reaction flask was then attached to a distillation column and most of the ethanol was distilled off. The residue while still hot, was poured into a beaker containing 400 grams of ice whereupon a white precipitate was formed which was separated by succession filtrations, was washed twice with 250 milliliter portions of water and was dried to yield 58.2 grams of crystalline material. Recrystallization from ethanol gave pure white crystals which melted at between 41 and 42° C. and in other respects had the known characteristics of benzyl phenyl sulfide.

*2. Synthesis of dibenzyl sulfide*

Using the same apparatus as that described above, 116 grams (0.92 mol) of benzyl chloride in 300 milliliters of absolute ethanol was placed in the flask. To this was added slowly with stirring at room temperature 110 grams of sodium sulfide monohydrate (0.54 mol) in 50 milliliters of water. Refluxing and stirring were continued for three days. At the end of that period the ethanol was distilled off and the residue was poured into a beaker containing 700 grams of ice. A precipitated solid was obtained which upon heating to a temperature slightly above room temperature was converted to an oil. This oil was poured into a smaller flask which was attached to a Vigreux column to distill off water and unreacted benzyl chloride. Recrystallization of the residue from 70 percent aqueous ethanol produced a yield of 41 grams of pure white crystals which had a melting point of 49° C.

As is amply set forth above, although the invention has been expressed primarily in terms of specific retarders and a specific amount of carbon black in a specific essentially saturated hydrocarbon polymer containing tertiary hydrogen atoms, a person skilled in the art will recognize that the principles expressed herein are equally applicable to the other retarders and polymers and to the ranges of composition all of which have been set forth. Experimental work carried out using other such materials and the expressed compositional ranges justifies these conclusions.

What is claimed is:

1. A composition which is stabilized against oxidation comprising from 0.5 percent to 5 percent by weight of carbon black particles of a maximum size of 1000 angstroms, from 0.01 percent to 5 percent of a thioether containing two carbocyclic benzoid aromatic nuclei at least one of which is joined through a methylene group to the sulfur atom, in which thioether the maximum number of carbon atoms in each moiety including substituents is 30, and an essentially saturated hydrocarbon polymeric material selected from the group consisting of polymers of ethylene, propylene, butene-1, 3-methyl butene-1, 4-methyl pentene-1, 4,4-dimethyl pentene-1, dodecene-1, 3-methyl pentene-1, and mixtures of any of these materials, and in which all weight percents are based on the said composition.

2. The composition of claim 1 in which the polymeric material is a homopolymer.

3. The composition of claim 1 in which the polymeric material is a copolymer.

4. The composition of claim 1 in which the thioether is benzyl phenyl sulfide.

5. The composition of claim 1 in which the thioether is dibenzyl sulfide.

6. The composition of claim 1 in which the polymeric material is a polymer containing random tertiary hydrogen atoms.

7. The composition of claim 6 in which the polymer is polyethylene.

8. The composition of claim 1 in which the polymeric material is a polymer containing ordered tertiary hydrogen atoms.

9. The composition of claim 8 in which the polymer is polypropylene.

10. The composition of claim 7 in which the thioether is benzyl phenyl sulfide.

11. The composition of claim 7 in which the thioether is dibenzyl sulfide.

References Cited in the file of this patent

UNITED STATES PATENTS

| | | |
|---|---|---|
| 2,431,303 | Billmeyer | Nov. 25, 1947 |
| 2,512,459 | Hamilton | June 20, 1950 |
| 2,643,241 | Crouch et al. | June 23, 1953 |
| 2,843,577 | Friedlander et al. | July 15, 1958 |

FOREIGN PATENTS

| | | |
|---|---|---|
| 201,160 | Australia | Jan. 11, 1956 |

OTHER REFERENCES

Badger: "Structures and Reactions of the Aromatic Compounds," 1954, page 43, Cambridge University Press.

Raff: "Polyethylene," 1956, page 402, Interscience Publishers Inc.

Schildknecht: "Polymer Processes," February 28, 1956, page 535, Interscience Publishers Inc.